US008539862B1

(12) United States Patent
Robinson

(10) Patent No.: US 8,539,862 B1
(45) Date of Patent: Sep. 24, 2013

(54) BUCKLE RELEASE TOOL

(75) Inventor: Marlene G. Robinson, Oakland, CA (US)

(73) Assignee: MiiG Enterprises, Inc., San Ramon, CA (US)

(*) Notice: Subject to any disclaimer, the term of this patent is extended or adjusted under 35 U.S.C. 154(b) by 220 days.

(21) Appl. No.: 13/048,647

(22) Filed: Mar. 15, 2011

Related U.S. Application Data

(60) Provisional application No. 61/331,829, filed on May 6, 2010.

(51) Int. Cl.
*B67B 7/16* (2006.01)
*B67B 7/04* (2006.01)
*B25B 19/00* (2006.01)
*B25F 1/00* (2006.01)
*B25D 1/04* (2006.01)
*B60R 22/00* (2006.01)
*A41F 1/00* (2006.01)
*A41F 9/00* (2006.01)
*F16B 45/00* (2006.01)

(52) U.S. Cl.
USPC .............. 81/15.9; 81/3.55; 81/3.47; 81/3.48; 81/3.49; 81/463; 7/100; 7/146; 280/801.1; 24/578.13; 24/578.14; 24/279.11; 24/580.11; 24/698.1

(58) Field of Classification Search
USPC ................. 81/3.55, 3.47, 3.48, 3.49, 463, 52, 81/15.9; 24/578.13, 578.14, 579.11, 580.11, 24/587.12, 698.1, 633; 269/3, 6, 95, 900; 29/270, 278, 255, 244; 7/170, 100, 146
See application file for complete search history.

(56) References Cited

U.S. PATENT DOCUMENTS

| | | | | | |
|---|---|---|---|---|---|
| 4,252,246 | A | * | 2/1981 | Johnson et al. | 220/288 |
| 4,497,094 | A | * | 2/1985 | Morris | 24/633 |
| 4,961,251 | A | * | 10/1990 | Smith | 24/633 |
| 5,050,277 | A | * | 9/1991 | Jimenez et al. | 24/633 |
| 5,442,840 | A | * | 8/1995 | Ewald | 24/633 |
| 2002/0112327 | A1 | * | 8/2002 | Baloga | 24/633 |

* cited by examiner

*Primary Examiner* — Monica Carter
*Assistant Examiner* — Danny Hong
(74) *Attorney, Agent, or Firm* — Charles L. Thoeming

(57) ABSTRACT

A buckle release tool includes a housing element having a convex back surface ergonomically sized to conform to a human hand and a tool element. The housing element includes a rounded perimeter surface having several shallow slots. A tool element dome is provided on the front surface. The tool element dome includes a soft plastic tip surface. A seat belt cutter and a window hammer are housed in an embodiment of buckle release tool. A separate, storage element for the buckle release tool is provided.

15 Claims, 4 Drawing Sheets

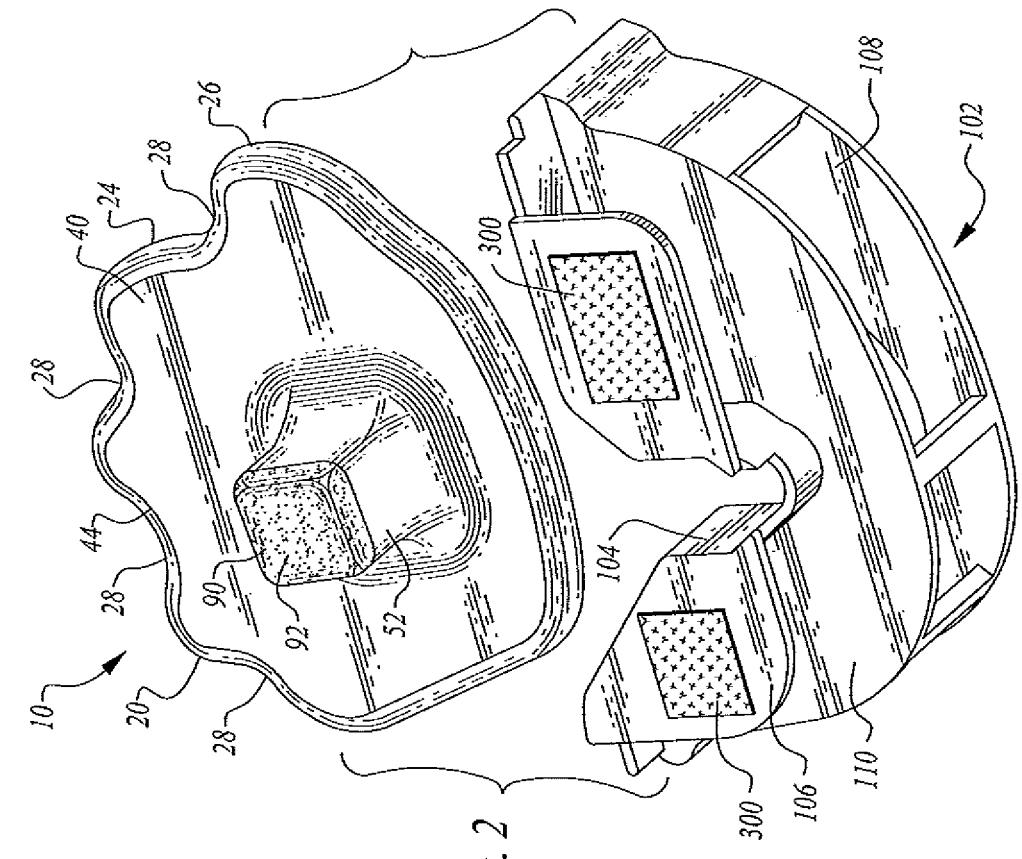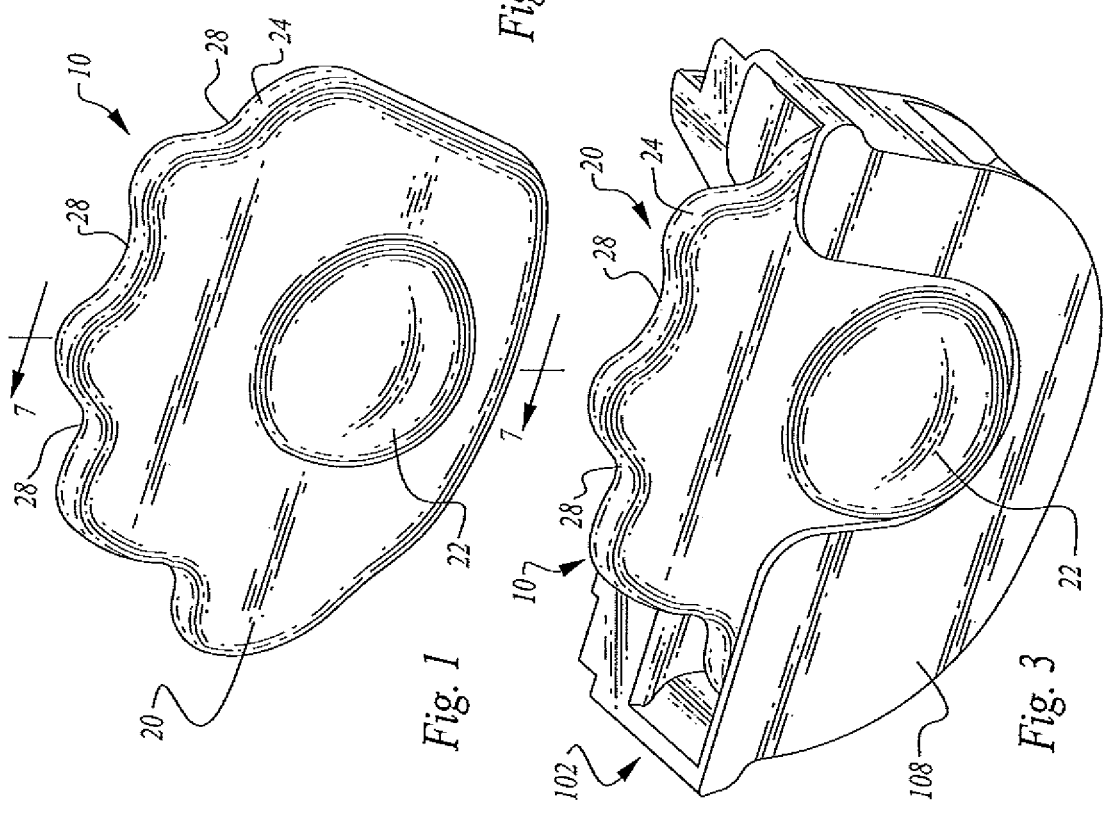

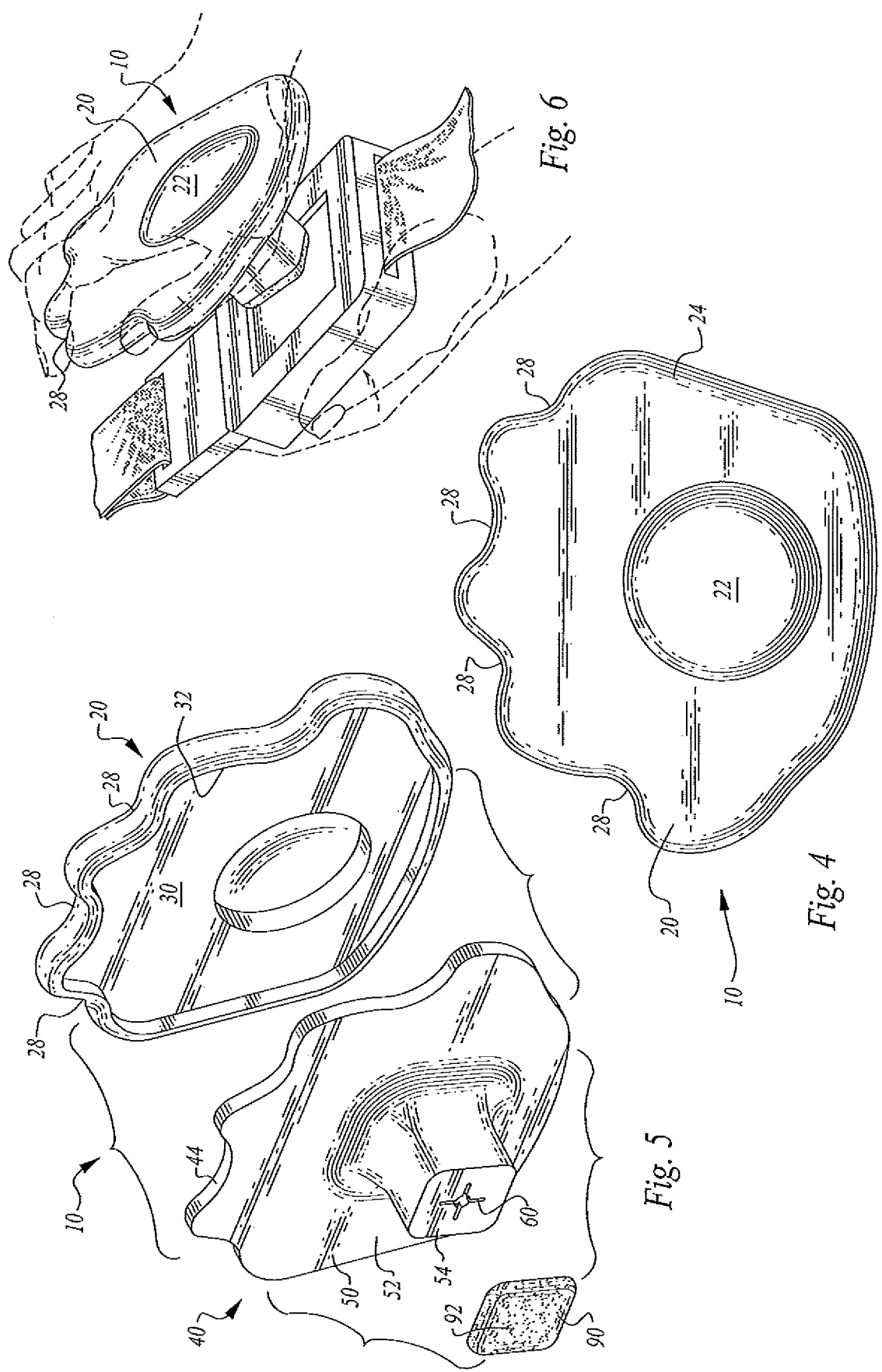

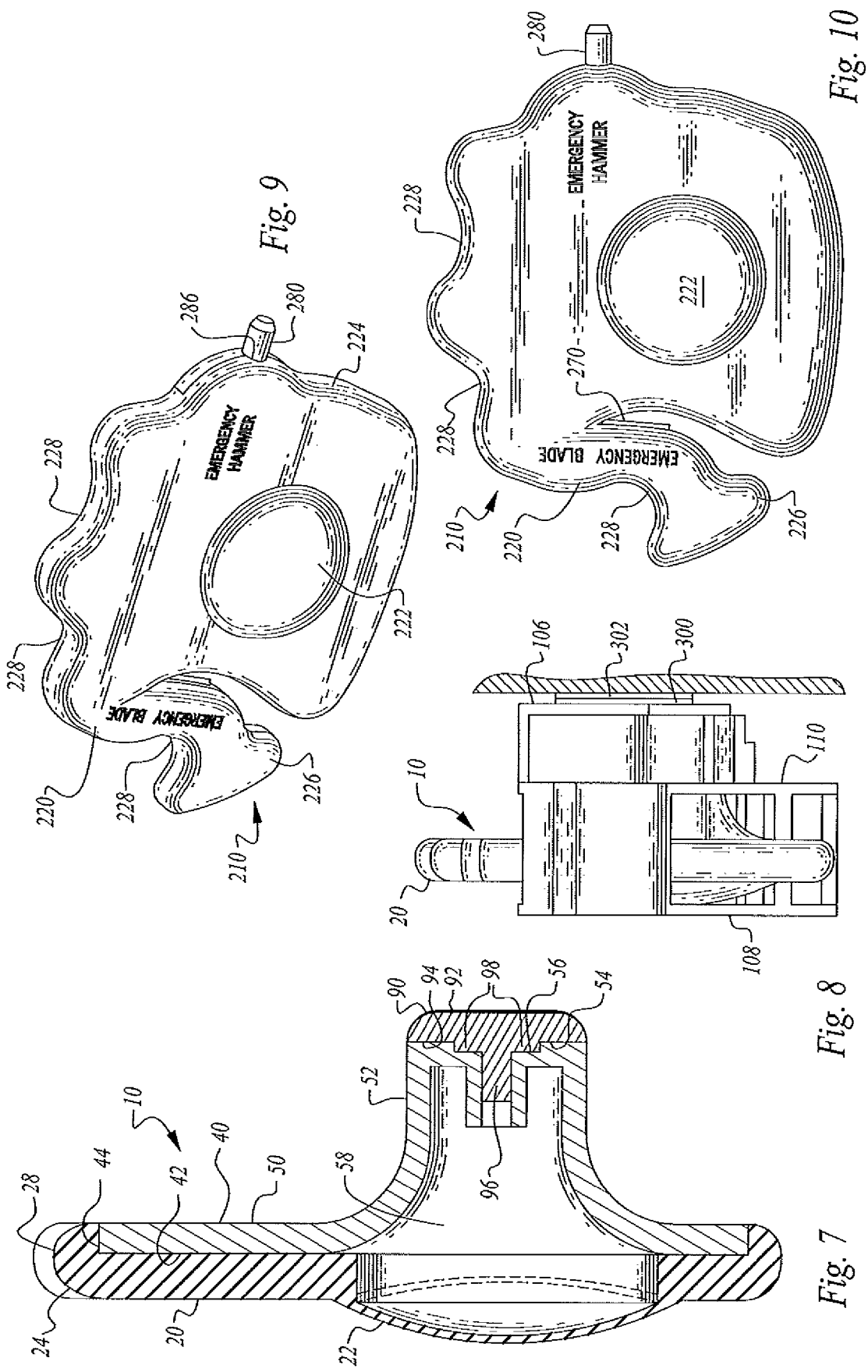

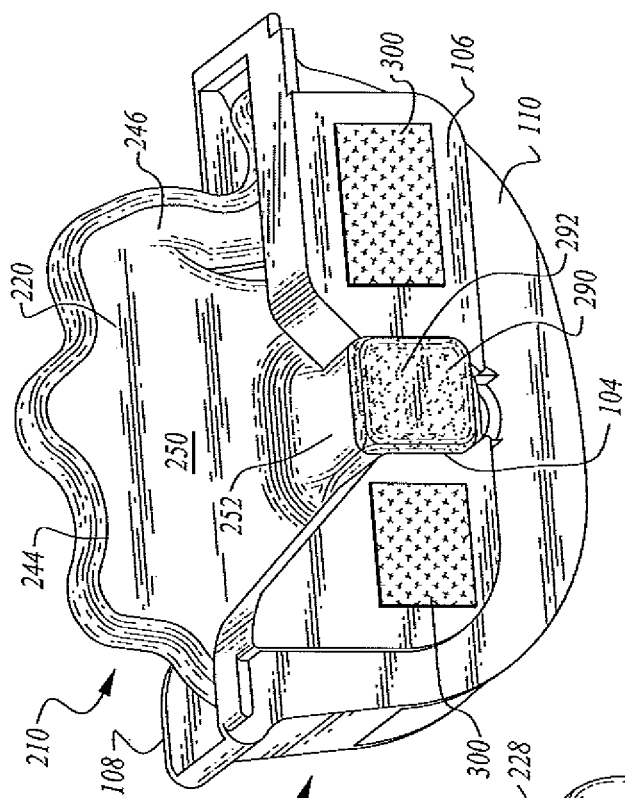
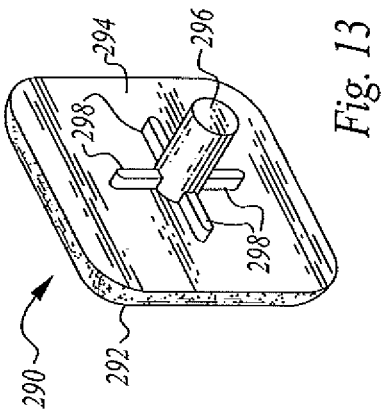
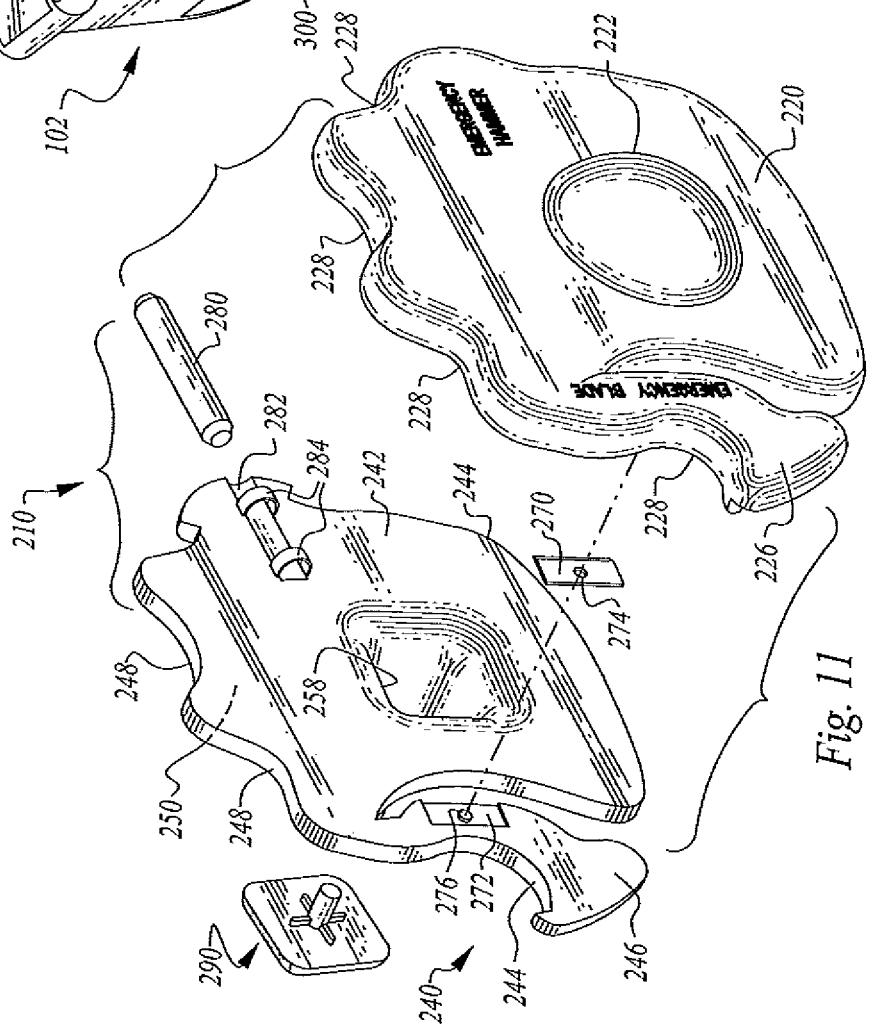
Fig. 12
Fig. 13
Fig. 11

BUCKLE RELEASE TOOL

CROSS-REFERENCES TO RELATED APPLICATIONS

This United States non-provisional patent application is based upon and claims the filing date of U.S. provisional patent application Ser. No. 61/331,829 filed May 6, 2010.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates generally to occupant restraint systems for automotive vehicles. More specifically it relates to a buckle release tool assembly including an ergonomic hand held tool for use in depressing the pre-existing actuator button of a car seat restraint harness and releasing the buckle from the locking engagement of the car seat restraint harness in a more convenient manner than through use of the pre-existing actuator button alone. The buckle release tool assembly can further include a seat belt cutter and a window hammer for emergency release from the car seat restraint harness and exit from the interior of the vehicle, and a buckle release tool assembly storage element.

BACKGROUND OF THE INVENTION

A typical automotive vehicle occupant restraint system has a buckle attached to the free end of a piece of belting whose opposite end is anchored on the vehicle body. The anchoring may be either by direct fastening or via a device such as a retractor. A tongue is attached to a free end of a complementary piece of belting whose opposite end is anchored on the body. When the restraint system is in use to restrain a seated occupant, the two pieces of belting are connected by inserting the tongue of the one piece into the buckle of the other piece and adjusting the restraint around the occupant.

The buckle comprises a casing which contains a spring-loaded latching mechanism for releaseably latching the buckle to the tongue. A typical buckle casing comprises an aperture which exposes an actuating button for depression by a person's thumb or fingertip to cause the latching mechanism to release the buckle from latching condition. In today's typical buckle the area of the actuating button which is exposed by the aperture approximates that of the thumb or fingertip. The actuating button surface against which the thumb or fingertip presses is generally flush with the surface of the casing containing the aperture. This same buckle and actuating button assembly is installed in child restraint seats designed to be secured by the original equipment manufactured vehicle occupant restraint system.

For any of a number of various reasons, a person may be impaired from unlatching a buckle of this type. For instance, in winter weather the use of mittens, especially bulky ones, makes it difficult to operate the actuating button. Some people may have physical conditions which impair their ability to unlatch a buckle. Many women find this type of buckle difficult to operate with long fingernails. Attempts to unlatch the buckle can cause ladies' fingernails to crack and/or break, and this tends to discourage them from using the associated restraint system. Hence, in situations such as these, a more convenient way to release the buckle from its latching condition is desirable, but automobile and child car seat manufacturers give the consumer little or no choice in this matter.

Additionally, persons suffering from tendinitis, an inflammation of the tendons below the thumb down to the wrist, such as De Quervain's tendonitis, typically experience pain on the thumb side of the wrist that radiates up the forearm. De Quervain's tendonitis mainly affects two tendons—the abductor pollicis longus, or long thumb abductor, and the extensor pollicis brevis, or short thumb extensor. These tendons come into play when the thumb is moved in a different plane from the hand, as when using the thumb to depress the buckle release or actuating button assembly as installed in child restraint seats designed to be secured by the original equipment manufactured vehicle occupant restraint system.

The buckle release tool provides an accessory actuator for an occupant restraint system buckle or child restraint system buckle which gives the owner of an automotive vehicle a choice in rendering the restraint belts in the vehicle more convenient for unlatching. Briefly, the buckle release tool is an ergonomic hand held tool for use in depressing the actuator button of a car seat restraint harness and releasing the buckle from the locking engagement of the car seat restraint harness in a more convenient manner than through use of the pre-existing actuator button alone.

The preferred embodiment of the buckle release tool contemplates a molded plastic ergonomic hand held tool having a protruding, elongated rigid dome on the tool distal surface head to engage the pre-existing restraint release actuating button and cause release of the restraint buckle by pressure applied to the proximal surface of the tool held in the user's hand. For use of the buckle release tool on child restraint systems, the user's free hand is positioned between the child and the buckle to press the actuating assembly from the rear towards the buckle release tool. A storage element for the buckle release tool is provided.

With the known problems associated with the art, the buckle release tool was conceived and one of its objectives is to provide a tool assembly for use in depressing the pre-existing actuator button of a car seat restraint harness and releasing the buckle from the locking engagement of the car seat restraint harness in a more convenient manner than through use of the pre-existing actuator button alone, and which application is easily adapted a variety of automotive vehicle occupant restraint systems including, but not limited to, child car seat restraint systems.

It is a further objective of the present invention to provide a buckle release tool which can easily and conveniently be stored in the vehicle with a child car seat and as an accessory to the child car seat.

It is still another objective of the present invention to provide a buckle release tool to alleviate hand or finger pain caused by repetitive motion of depressing the pre-existing actuator button of vehicle occupant restraint systems including, but not limited to, child car seat restraint systems.

Yet another objective of the present invention to is provide a useful and safe buckle release tool to enable individuals with chronic hand pain or limited hand function to use a standard vehicle occupant restraint systems including, but not limited to, child car seat restraint systems.

Other objectives and advantages of the buckle release tool become apparent to those skilled in the art as a more detailed explanation of the invention is presented below. The drawings disclose a preferred embodiment of the buckle release tool according to the best mode contemplated at the present time in carrying out the buckle release tool.

DISCLOSURE OF INVENTION

At least some of the foregoing difficulties are addressed by the buckle release tool.

The buckle release tool includes an injection molded, PET plastic housing element having a convex back surface ergonomically sized to conform to a human hand and a tool element. The housing element convex back surface is sized to be received and housed in the palm portion of the hand of a user of the buckle release tool. The buckle release tool housing element further includes a rounded perimeter surface having several shallow slots for finger and thumb placement of the user's hand. The buckle release tool element includes a substantially planar front surface with a protruding, elongated rigid dome on the front surface. The tool element dome includes a tip surface made from the same material as the housing element convex back surface. An alternate embodiment provides a hook portion for both the housing and tool elements, and a seat belt cutter is housed in the buckle release tool between the perimeter surface hook and the perimeter surfaces of the housing and tool elements. An alternate embodiment also provides a steel shank window hammer is also housed within the buckle release tool housing and tool elements with a portion of the shank extending from the housing rounded perimeter surface opposite the perimeter surface side comprising the hook and seat belt cutter.

An injection molded, PET plastic self-contained and detachable buckle release tool storage element is provided. An embodiment of the buckle release tool storage element includes a slotted back side surface sized to receive, house, and detachably secure protruding, elongated rigid dome of the buckle release tool element front surface. An embodiment of the buckle release tool storage element further provides a back side attachment surface having hook and loop fastening assembly for securing the buckle release tool element to a hard surface also having a hook and loop fastening assembly. An embodiment of the storage element provides a substantially planar front side surface including a planar front side access port.

While the buckle release tool has been, or will be, described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

Any feature or combination of features described herein are included within the scope of the buckle release tool provided that the features included in any such combination are not mutually inconsistent as will be apparent from the context, this specification, and the knowledge of one skilled in the art. For purposes of summarizing buckle release tool, certain aspects, advantages and novel features of the buckle release tool are described herein. Of course, it is to be understood that not necessarily all such aspects, advantages or features will be embodied in any particular embodiment of the buckle release tool. Additional features, advantages, objects and aspects of the buckle release tool are apparent in the following detailed description, accompanying drawings, and claims that follow.

BRIEF DESCRIPTION OF DRAWINGS

The above stated features, aspects, and advantages of the buckle release tool including a separate, detachable storage element will become better understood with regard to the following description, appended claims, and accompanying drawings as further described.

FIG. 1 is a top perspective view of an embodiment of buckle release tool 10 depicting the housing element convex back surface 22, the housing element rounded perimeter surface 24, and housing element rounded perimeter finger slots 28.

FIG. 2 is a top perspective view of an embodiment of buckle release tool of FIG. 1 housed in the buckle release tool storage element 102.

FIG. 3 is a bottom perspective view of an embodiment of buckle release tool 10 of FIGS. 1 and 2 positioned to be received by the buckle release tool storage element 102 of FIG. 2.

FIG. 4 is a top planar view of an embodiment of buckle release tool 10 of FIG. 1, depicting: a) the housing element 20, b) housing element convex back surface 22, and c) housing element rounded perimeter slots 28.

FIG. 5 is an exploded bottom perspective view of an embodiment of buckle release tool 10 of FIG. 1 depicting the housing element 20, the tool element 40, and dome-tip assembly 90.

FIG. 6 is a top perspective view of an embodiment of buckle release tool 10 of FIG. 1, depicting the buckle release tool in a user's hand to engage a representative buckle release assembly.

FIG. 7 is a sectional view of an embodiment of buckle release tool 10 of FIG. 1 taken at "7-7."

FIG. 8 is a right elevation view of an embodiment of buckle release tool 10 and buckle release tool storage element 102 of FIG. 2, depicting the buckle release tool storage element slotted back side attachment surface 106 affixed to an external planar surface.

FIG. 9 is a is a top perspective view of an embodiment of buckle release tool 210 depicting the housing element 220, the housing element convex back surface 222, the housing element rounded perimeter surface 224, the housing element rounded perimeter surface hook 226, housing element rounded perimeter finger slots 228, hammer assembly shank 280, and hammer assembly second housing channel 286 in the housing element rounded perimeter surface 224.

FIG. 10 is a top planar view of an embodiment of buckle release tool 210 depicting the housing element 220, the housing element convex back surface 222, the housing element rounded perimeter surface hook 226, housing element rounded perimeter finger slots 228, hammer assembly shank 280, and cutting assembly blade 270.

FIG. 11 is an exploded top perspective view of the embodiment of buckle release tool 210 of FIG. 10.

FIG. 12 is a top rear perspective view of the embodiment of buckle release tool 210 of FIG. 10 and embodiment of buckle release tool storage element 102 showing the buckle release tool 210 housed within the buckle release tool storage element 102.

FIG. 13 is a detailed perspective view of the dome-tip assembly 290.

BEST MODE FOR CARRYING OUT THE INVENTION

The following discussion describes in detail various embodiments of the buckle release tool 10 and 210 including housing elements 20 and 220, respectively, tool elements 24 and 240, respectively, and a buckle release tool storage element 102. This discussion should not be construed, however, as limiting the buckle release tool to those particular embodiments. Practitioners skilled in the art will recognize numerous other embodiments as well. For a definition of the complete scope of the scooping tool assembly, the reader is directed to the appended claims.

FIGS. 1-13 depict various embodiments 10 and 210 of the buckle release tool including housing elements 20 and 220, respectively, tool elements 24 and 240, respectively, a cutting assembly 270, a hammer assembly 280, dome-tip assemblies 90 and 290, respectively, and buckle release tool storage element 102.

An embodiment of a buckle release tool 10 includes an injection molded, plastic housing element 20 and a corresponding plastic tool element 40. The combined housing element 20 and tool element 40 provide a convex back surface 22 ergonomically sized to conform to a human hand with a rounded perimeter surface 24 comprising a hook 26 and a plurality of slots 28 for finger and thumb placement. A substantially planar front surface 50 of the buckle release tool includes a protruding, elongated rigid dome 52 on the substantially planar front surface 52. The dome tip surface 92 of the dome-tip assembly 90 is made of the same materials as the convex back surface, and the dome-tip assembly 90 further includes a post 96 and locking elements 98, FIGS. 1-7.

The housing element 20 of an embodiment of the buckle release tool 10 includes a convex back surface 22, rounded perimeter surfaces 24 having a plurality of slots 28, and a planar front surface 30 recessed within the housing element 20 rounded perimeter surfaces 24. The housing element 20 convex back surface 22 is sized to be received in the palm of a human hand. The housing element 20 rounded perimeter surfaces 24 and the plurality of slots 28 of the rounded perimeter surfaces 24 are sized to be gripped by the fingers and thumb of a human hand receiving the housing element 20 convex back surface 22, FIGS. 1, 4 and 6.

The tool element 40 of an embodiment of the buckle release tool 10 includes a planar back surface 42 and perimeter surfaces 44 having a plurality slots 48 sized to be received and fixedly housed against the housing element 20 planar front surface 30 recessed within housing element 20 rounded perimeter surfaces 24. A tool element 40 substantially planar front surface 50 provides a protruding, elongated rigid dome 50 positioned on the tool element 40 substantially planar front surface 50 to correspond to the position of the housing element 20 convex back surface 22. A substantially planar dome top surface 54 includes a tip attachment assembly opening 60. The base of the protruding, elongated rigid dome 50 corresponds to an opening 58 in the tool element 40 planar back surface 42, FIGS. 1-7.

An embodiment of the buckle release tool 10 includes dome-tip assembly 90 having a dome-tip assembly 90 exterior surface 92, a dome-tip assembly attachment post 96, and at least one locking element 98, FIGS. 5 and 7. The attachment post 96 and at least one locking element 98 are sized to be received and housed within the dome planar top surface 54 surface tip attachment assembly 56.

An embodiment of the buckle release tool 10 includes a storage element 102 having a slotted back side 104, a back side attachment surface 106, a planar front side 108, and a planar side access port 110, FIGS. 2, 3 and 8. An assembly for pile fabric hook and loop fastening 300 generally described in U.S. Pat. No. 3,009,235, and sold by American Velcro, Inc., under the trademark VELCRO® is affixed to the buckle release tool storage element 102 back side attachment surface 106 for securing the buckle release toll storage element 102 to an external surface comprising a corresponding assembly for pile fabric hook and loop fastening 302, FIGS. 2, 8, and 12.

An embodiment of the buckle release tool 210 includes a metal blade 270 having a cutting surface edge and a metal blade anchor opening 274, a blade receptacle 272 sized to house the metal blade 270 in the hook portion 246 of the tool element back surface 250, and a blade receptacle anchor pin 276 sized to receive and hold the metal blade 270 within the blade receptacle 272. The metal blade 270 cutting surface edge extends uniformly within the channel between the housing and tool hook elements, 226 and 246 respectively, and the rounded perimeter surface 224 of the housing element 220 and the perimeter surface 244 of the tool element 240, FIGS. 9-11.

An embodiment of the buckle release tool 210 includes a steel shank 280, a first channel 282 in the tool element 240 back surface 242 sized to receive and hold the steel shank 280. At least one first channel clip 284 sized to hold the steel shank 280 in the first channel 282, is provided. A second channel 286 is included in the housing element 220 planar front surface 230, and is sized to receive and hold the steel shank 280, FIGS. 9-11.

Embodiments of the release tool 10 and 210 include housing element convex back surfaces, 22 and 222 respectively, having a soft, flexible surface made from any one of the family of generic low-elasticity thermoplastic elastomers ("TPE") suitable for injection molding, such as TPE plastics manufactured as Versaflex® or Duraflex®. It is a useful feature of the family of TPE that they easily are welded to either Polypropylene ("PP") or Acrylonitrile Butadiene Styrene ("ABS"). Either PP or ABS is a suitable material for the housing element rounded perimeter surface 24 and the housing element planar front surface 30.

Embodiments of the release tool 10 and 210 include dome tip surfaces, 92 and 292 respectively, having a soft, flexible surface made from any one of the family of TPE suitable for injection molding, such as TPE plastics manufactured as Versaflex® or Duraflex®.

The most suitable method of assembly of the housing elements 20 and 220, tool elements 40 and 240, and storage element 102, of embodiments of the buckle release tool 10 and 210 is solvent glue, such as a di-methyl-chloride based solvent, which would create polymer bonds between the plastic surfaces. Alternatively, a substrate comprising an adhesive, such as a di-methyl-chloride based glue, could bond the plastic surfaces together adequately.

All equivalent relationships to those illustrated in the drawings and described in the specification are intended to be encompassed by the buckle release tools 10 and 210, housing elements 20 and 220, tool elements 24 and 240, and buckle release tool storage element 102.

Accordingly, disclosed and described the buckle release tool provides a tool assembly for use in depressing the pre-existing actuator button of a car seat restraint harness and releasing the buckle from the locking engagement of the car seat restraint harness in a more convenient manner than through use of the pre-existing actuator button alone. Application of the buckle release tool is easily adapted a variety of automotive vehicle occupant restraint systems including, but not limited to, child car seat restraint systems. The buckle release tool can easily and conveniently be stored in the vehicle with a child car seat and as an accessory to the child car seat as described and disclosed. The buckle release tool usefully alleviates hand or finger pain caused by repetitive motion of depressing the pre-existing actuator button of vehicle occupant restraint systems including, but not limited to, child car seat restraint systems, and provides a safe buckle release tool for individuals already suffering from chronic hand pain or limited hand function to use these separate or conjoined systems.

Therefore, the foregoing is considered as illustrative only of the principles of the buckle release tool apparatus, system, and/or method. Additionally, since numerous modifications and changes will readily occur to those skilled in the art, it is not desired to limit the apparatus, system and method for buckle release tool to the exact construction and operation shown and described, and further, all suitable modifications and equivalents may be resorted to, falling within the scope of the appended claims.

I claim:

1. A buckle release tool comprising in combination:
   a) a housing element comprising a back surface, a rounded perimeter surface comprising a plurality of slots, and a planar front surface recessed within the housing element rounded perimeter surface, the housing element back surface further comprising a central convex portion sized to be received in the palm of a human hand, the housing element rounded perimeter surface and a plurality of slots are sized to be gripped by the fingers and thumb of the human hand receiving the housing element back surface central convex portion;
   b) a tool element comprising a planar back surface comprising a central opening, a perimeter surface comprising a plurality of slots sized to be received and fixedly housed against the housing element planar front surface recessed within the tool housing rounded perimeter surface, and a substantially planar tool element front surface further comprising a protruding, elongated rigid dome on the substantially planar tool element front surface and further comprising a dome top surface comprising a tip attachment assembly; and
   c) dome-tip assembly comprising a tip element and a dome-tip element attachment assembly sized to be fixedly received by the dome top surface tip attachment assembly, the dome-tip element attachment assembly comprising an attachment post and at least one locking element,
   whereby, the tip element of the buckle release tool as a separate stand alone assembly is adapted to engage and activate a release element of a separate seat belt assembly or a separate child safety seat assembly.

2. The buckle release tool assembly of claim 1, further comprising a buckle release tool storage element comprising a slotted back side, a back side attachment surface, a planar front side, and a planar side access port.

3. The buckle release tool assembly of claim 2, further comprising an assembly for hook and loop fastening affixed to the buckle release tool storage element back side attachment surface for securing the buckle release tool storage element to an external surface comprising an assembly for hook and loop fastening.

4. The buckle release tool assembly of claim 1, wherein the housing element, the tool element, and the buckle release tool storage element comprise injection molded recycled PET plastic.

5. The buckle release tool assembly of claim 1, wherein the housing element central convex portion comprises a soft, flexible surface made from any one of the family of generic low-elasticity thermoplastic polymers ("TPE") suitable for injection molding, such as TPE plastics manufactured as Versalflex® or Duraflex®.

6. A separate, stand alone buckle release tool comprising in combination:
   a) a housing element comprising a back surface comprising a central convex portion, rounded perimeter surfaces comprising a plurality of slots, and a planar front surface recessed within the housing element rounded perimeter sides;
   b) a tool element comprising a planar back surface comprising a central opening, perimeter surfaces comprising a plurality of slots sized to be received and fixedly housed against the housing planar front surface recessed within the tool housing rounded perimeter surfaces, and a substantially planar tool element front surface further comprising a protruding, elongated rigid dome on the substantially planar tool element front surface comprising a dome top surface comprising a tip attachment assembly opening;
   c) assembly for attaching a tip element within the dome top surface tip attachment assembly opening, the assembly comprising a dome-tip attachment post and at least one locking element, whereby the tip element is adapted to engage and activate a release element of a separate seat belt assembly or a separate child safety seat assembly; and
   d) a buckle release tool storage element comprising a slotted back side, a back side attachment surface, a planar front side, and a planar side access port.

7. The buckle release tool assembly of claim 6, wherein the housing element central convex portion is sized to be received in the to be received in the palm of a human hand, and the plurality of finger slots of then rounded perimeter surfaces are sized to be gripped by the fingers and thumb of the human hand receiving the housing element.

8. The buckle release tool assembly of claim 6, wherein a tip element surface comprises a soft, flexible surface made from any one of the family of generic low-elasticity thermoplastic polymers ("TPE") suitable for injection molding, such as TPE plastics manufactured as Versalflex® or Duraflex®.

9. The buckle release tool assembly of claim 6, wherein the housing element, the tool element, and the buckle release tool storage element comprise injection molded recycled PET plastic.

10. The buckle release tool assembly of claim 6, wherein the housing element central convex portion comprises a soft, flexible surface made from any one of the family of generic low-elasticity thermoplastic polymers ("TPE") suitable for injection molding, such as TPE plastics manufactured as Versalflex® or Duraflex®.

11. An assembly for unitary buckle release tool comprising in combination:
   a) a housing element and corresponding tool element, the housing and tool elements comprising in combination a housing element back surface convex portion ergonomically sized to conform to a human hand, a rounded perimeter surface comprising a plurality of slots for finger and thumb placement, a tool element substantially planar front surface, the tool element substantially planar front surface further comprising a protruding, elongated rigid dome on the tool element front surface and comprising a dome tip surface comprising an attachment post and at least one locking element sized to be fixedly received into a dome tip surface opening, wherein the dome tip surface is adapted to engage and activate a release element of a separate seat belt assembly or a separate child safety seat assembly; and
   b) a self-contained and detachable buckle release tool storage element comprising a slotted back side, a back side attachment surface, a planar front side surface, and a planar side access port, the back side attachment surface further comprising means for hook and loop fastening to and external hard surface further comprising means for hook and loop fastening.

12. The buckle release tool assembly of claim 11, wherein the housing element, the tool element, and the self-contained and detachable buckle release tool storage element comprise injection molded recycled PET plastic.

13. The buckle release tool assembly of claim 11, wherein the housing element back surface convex portion comprises a soft, flexible surface comprising any one of the family of generic low-elasticity thermoplastic polymers ("TPE") suitable for injection molding, such as TPE plastics manufactured as Versalflex® or Duraflex®.

14. The buckle release tool assembly of claim 11, wherein the rounded perimeter surface and the tool element substantially planar front surface comprise Polypropylene or Acrylonitrile Butadiene Styrene.

15. The buckle release tool assembly of claim 11, wherein the dome tip surface comprises a soft, flexible surface comprising any one of the family of generic low-elasticity thermoplastic polymers ("TPE") suitable for injection molding, such as TPE plastics manufactured as Versalflex® or Duraflex®.

* * * * *